UNITED STATES PATENT OFFICE.

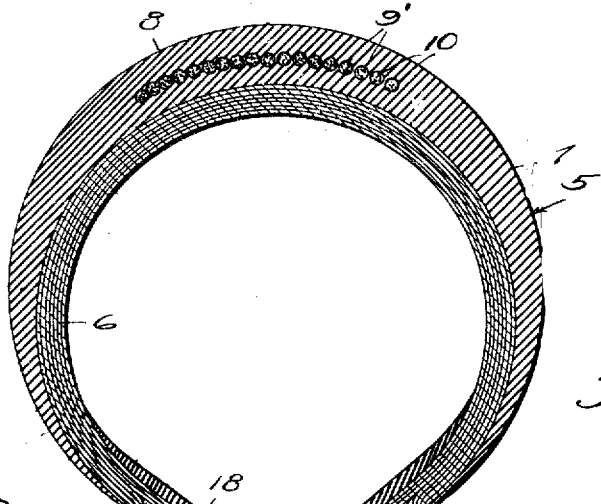
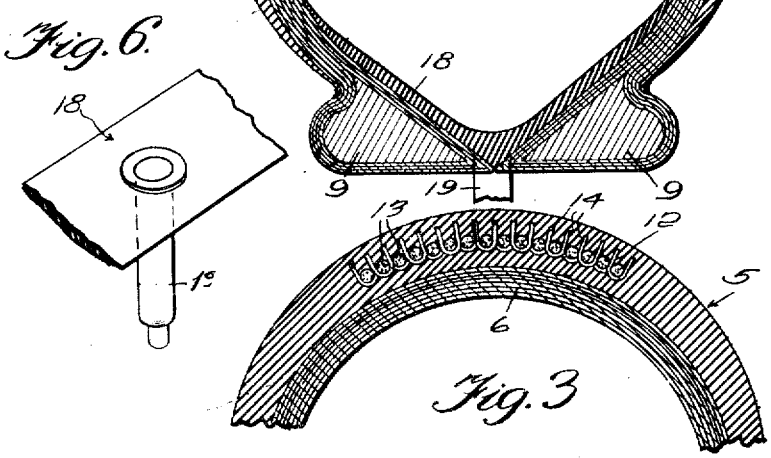
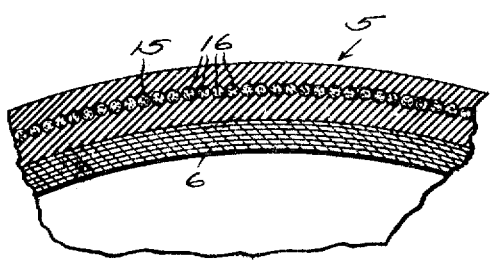
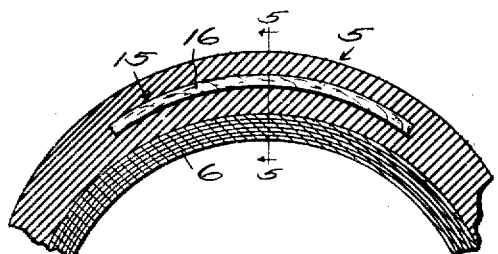
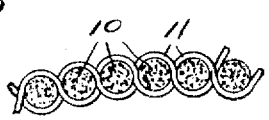

DEMETREOS J. DEMAS, OF PITTSBURGH, PENNSYLVANIA.

TIRE CASING OR SHOE.

1,261,012.　　　　Specification of Letters Patent.　　Patented Apr. 2, 1918.

Application filed October 26, 1917.　Serial No. 198,687.

Be it known that I, DEMETREOS J. DEMAS, a citizen of the United States, residing at Pittsburgh, in the county of Allegheny and State of Pennsylvania, have invented certain new and useful Improvements in Tire Casings or Shoes, of which the following is a specification.

My invention relates to improvements in tire casings or shoes provided with internal reinforcing means or armors.

An important object of the invention is to provide a tire casing of the above mentioned character, having means which renders the same puncture proof to a high degree and will prolong the life of the tire casing.

A further object of the invention is to provide means of the above mentioned character, which are simple in construction and inexpensive to manufacture.

Other objects and advantages of the invention will be apparent during the course of the following description.

In the accompanying drawings forming a part of this specification and in which like numerals are employed to designate like parts throughout the same, Figure 1 is a transverse sectional view through the tire casing embodying my invention, Fig. 2 is an enlarged transverse section through the internal armor element, Fig. 3 is a similar view, parts broken away, through a slightly different form of the invention, Fig. 4 is a similar view of a third different form of the invention, Fig. 5 is a detail section taken on line 5—5 of Fig. 4, and, Fig. 6 is a perspective view of an inner inflating strip.

In Figs. 1 to 4 inclusive, the numeral 5 designates a tire casing or shoe. This tire casing or shoe comprises inner sections of fabric 6, which are covered or coated with rubber, as is well known. The numeral 7 designates the outer portion of the casing formed of rubber and providing a tread portion 8. The tire casing 5 is provided at its inner edges with beads 9, as shown. The several parts or sections of the tire casing are vulcanized together, as is the usual practice.

In Fig. 1, the tread portion 8 is shown as provided with an internal armor 9', which is embedded therein. This internal armor 9' is formed of ropes or cords 10 or the like. The ropes or cords 10 are preferably formed of hemp or cotton, while other suitable material may be employed. The ropes or cords 10 extend circumferentially of the tire casing or shoe, and are bound together by transverse tying elements 11 woven thereabout and preferably in the form of slight strands of wire, as clearly shown in Fig. 2.

In Fig. 3, I have provided an internal armor 12 for the tread portion 8, comprising ropes or cords 13, which are embedded in the tread portion 8 and extend circumferentially thereof. These ropes or cords 13 are bound together in a similar manner to the binding ropes or cords 10. Passed about the ropes or cords 13 are strands or loops 14, which are approximately U-shaped and extend radially outwardly. These strands or loops are somewhat similar to the pile of an oriental rug. These radially extending strands are embedded in the tread portion of the tire and are found to greatly increase in strength and durability.

In Figs. 4 and 5, an internal armor 15 is provided, embodying ropes or cords 16, which are embedded in the tread portion 8 and extend transversely thereof. These ropes or cords are bound together in a similar manner to the ropes 10.

In all forms of the invention, particular attention is called to the fact that the internal armor is arranged wholly exteriorly of the reinforcing 6 and constitutes no part thereof, while this tire armor is also spaced from the outer surface of the tire casing 8.

In Figs. 1 and 6, I have shown an inflating strip 18, formed of suitably strong and flexible rubber, and carrying an inflating valve 19, of any well known or preferred construction. This inflating strip is designed to take the place of the ordinary inner tube and is arranged within the tire casing or shoe 5 upon the beads 9, which contact with each other. The beads are provided with cut-out portions at a suitable point to receive the valve 19. The ends of the strip 18 are adapted to be arranged in over-lapping relation. It is obvious that when the air is admitted into the tire casing 5 through the valve 19, the inflating strip 5 will be compressed against the tire casing, and form an air tight joint therewith, thus dispensing with the use of the ordinary inner tube. This inflating strip by being arranged in the inner portion of the tire casing is not liable to puncture.

It is to be understood that the forms of my invention herewith shown and described are to be taken as preferred examples of the same, and that various changes in the shape, size, and arrangement of parts may be resorted to without departing from the spirit of the invention or the scope of the subjoined claim.

Having thus described my invention, I claim:

A tire casing of the character described, comprising a carcass formed of rubber and having a fabric reinforcement in the inner portion thereof and an internal armor embedded in the rubber tread portion of the carcass and arranged exteriorly of the fabric reinforcement, said armor comprising a plurality of fibrous cords extending longitudinally of said tread portion in close relation, and fibrous strands passed around the inner sides of the longitudinal cords with their ends projecting radially and outwardly beyond the cords for a substantial distance.

In testimony whereof I affix my signature.

DEMETREOS J. DEMAS.